United States Patent [19]

Johnson

[11] Patent Number: 5,504,062
[45] Date of Patent: Apr. 2, 1996

[54] FLUID SYSTEM FOR CONTROLLING FLUID LOSSES DURING HYDROCARBON RECOVERY OPERATIONS

[75] Inventor: Michael H. Johnson, Houston, Tex.

[73] Assignee: Baker Hughes Incorporated, Houston, Tex.

[21] Appl. No.: 270,698

[22] Filed: Jul. 5, 1994

Related U.S. Application Data

[63] Continuation-in-part of Ser. No. 964,413, Oct. 21, 1992, Pat. No. 5,325,921.

[51] Int. Cl.$^6$ .............................. E21B 43/24; C09K 7/02
[52] U.S. Cl. .................. 507/212; 507/213; 507/269; 507/111; 507/110; 507/140; 507/906
[58] Field of Search ...................... 507/212, 213, 507/269, 906, 111, 110, 140

[56] References Cited

U.S. PATENT DOCUMENTS

| | | | |
|---|---|---|---|
| 3,281,354 | 10/1966 | Scott et al. | 252/8.55 |
| 3,408,296 | 10/1968 | Kuhn et al. | 252/8.55 |
| 3,516,496 | 6/1970 | Barkman et al. | 166/281 |
| 3,785,438 | 1/1974 | Jackson et al. | 166/296 |
| 3,844,361 | 10/1974 | Jackson | 175/66 |
| 3,986,964 | 10/1976 | Smithey | 252/8.5 A |
| 3,988,246 | 10/1976 | Hartfiel | 252/8.5 A |
| 4,025,443 | 5/1977 | Jackson | 252/8.5 A |
| 4,098,700 | 7/1978 | Hartfiel | 252/8.5 A |
| 4,140,639 | 2/1979 | Jackson et al. | 252/8.5 A |
| 4,186,803 | 2/1980 | Mondshine | 166/292 |
| 4,192,756 | 3/1980 | Mondshine | 252/8.55 R |
| 4,369,843 | 1/1983 | Mondshine | 166/292 |
| 4,422,947 | 12/1983 | Dorsey et al. | 507/212 |
| 4,620,596 | 11/1986 | Mondshine | 166/292 |
| 4,621,692 | 11/1986 | Mondshine | 166/281 |
| 4,650,593 | 3/1987 | Slingerland | 252/8.5 |
| 4,822,500 | 4/1989 | Dobson, Jr. et al. | 507/212 |
| 5,228,524 | 7/1993 | Johnson et al. | 175/72 |
| 5,325,921 | 7/1994 | Johnson et al. | 166/280 |

OTHER PUBLICATIONS

N. C. Mahajan et al., "Bridging Particle Size Distribution: A Key Factor in the Designing of Non–Damaging Completion Fluids," *Fourth Symposium on Formation Damage Control of the Society of Petroleum Engineers,* Jan. 28–29, 1980.
"Actigum® CS6DF for Drilling Fluids," Technical Literature Brochure, Sanofi Bio–industries, Paris, France, May 1992.

Primary Examiner—Gary E. Hollinden
Assistant Examiner—Joseph D. Anthony
Attorney, Agent, or Firm—Rosenblatt & Redano

[57] ABSTRACT

A fluid system has been discovered using a distribution of graded calcium carbonate particle sizes, a biopolymer and a polymerized starch. The biopolymer is a non-ionic polysaccharide of the scleroglucan type. It is important that the calcium carbonate particles be distributed across a wide size range to effectively prevent filtration or fluid loss into the formation. Since the filter cake particles do not invade the well bore due to the action of the biopolymer and starch, no high pressure spike occurs during the removal of the filter cake. This high pressure spike indicates damage to the formation and well bore surface, which damage typically reduces overall permeability of the formation. The rheological properties of the fluid allow it to be used in a number of applications where protection of the original permeable formation is desirable. The applications include, but are not limited to, drilling fracturing and controlling fluid losses during completion operations, such as gravel packing or well bore workovers.

10 Claims, No Drawings

FLUID SYSTEM FOR CONTROLLING FLUID LOSSES DURING HYDROCARBON RECOVERY OPERATIONS

CROSS-REFERENCE TO RELATED APPLICATION

This application is a continuation-in-part application from U.S. Ser. No. 07/964,413 filed on Oct. 21, 1992 now U.S. Pat. No. 5,325,921.

FIELD OF THE INVENTION

The invention relates to fluid or mud systems for use in controlling fluid losses during hydrocarbon recovery processes, such as drilling, fracturing, gravel packing and well bore workovers, and more particularly relates to such fluids, in one aspect, which form a durable, thin filter cake, but which is easy to remove and results in little damage to the permeability of the formation.

BACKGROUND OF THE INVENTION

Horizontal wells drilled and completed in unconsolidated sand reservoirs have become feasible recently, due to new technology and completion methods. Wells of this type require sand control, for example such as long open hole gravel packs or the installation of mechanical sand exclusion devices (slotted liners, prepacked screens, etc.). Successful wells have been completed with horizontal, producing intervals as long as 1800 ft. (550 m) using these methods of sand control.

Usually the wells are drilled with conventional drilling muds to the top of the pay zone and casing is set. The cement is then drilled out to the casing shoe and the shoe is tested. The drilling mud is then displaced with a "low damage potential drilling fluid" generally consisting of polymers, viscosity enhancers and soluble particles for building a filter cake. The particles are usually graded salt (NaCl) or graded calcium carbonate ($CaCO_3$), though the distribution of the size of the particles within a particular graded product has never been a concern. These compounds are used because they are soluble in undersaturated brines or hydrochloric acids. One problem with prior art filter cakes is that they are often difficult to remove, requiring high pressures to do so. Under such conditions, damage results to the formation. Such damage is believed to occur because the filter cake invades the formation and becomes "cemented" thereto and must be forcibly removed at high pressure; the forceful removal is thought to cause damage to the permeability of the formation.

After the open hole interval has been drilled to total depth, the gravel pack screen or sand exclusion device is placed in the open hole interval. To do this it becomes necessary to circulate the drilling fluid from the open hole so that the well can be gravel packed or the sand exclusion setting can be tested. Displacement of the drilling fluid with a solid-free completion brine, usually viscosified with a water soluble polymer, e.g. hydroxyethylcellulose (HEC) or xanthum gum derivative, is necessary. Concern about the physical erosion of the filter cake with the completion fluid is also always an issue. That is, the filter cake should be durable and stable enough to permit the completion or other operation to take place and protect the well bore during the entire operation.

The ideal drilling mud or drill-in fluid would mechanically seal all pore openings exposed to the well bore, stay intact during completion operations, then be easily removed by production of oil or gas. Problems arise in designing these fluids or muds because production zones vary in pressure, permeability, porosity and formation configuration. Generally, fluids used to control fluid leak-off in permeable formations require an initial high pressure spike before removal can begin, from about 300 to 500 psi. This pressure spike is indicative of damage to the original permeability of the permeable formation. It would be desirable if fluids could be devised which would easily form an impermeable filter cake to prevent the loss of expensive completion fluids to the formations and which effectively protects the original permeable formation during various completion operations such as gravel packing or well bore workovers. At the same time, however, it is also highly desirable for the filter cake to be easily removable at the beginning of production causing little or no damage to the formation.

SUMMARY OF THE INVENTION

Accordingly, it is an object of the present invention to provide a fluid system which forms a very durable, thin filter cake on the permeable formation and prevents fluid losses thereto.

It is another object of the present invention to provide a fluid system which forms a filter cake that can be easily removed with little or no damage to the formation.

It is yet another object of the invention to provide a fluid system for controlling fluid loss which has application during drilling, completion and stimulation of permeable reservoirs, during a variety of such operations such as gravel packing or well bore workovers.

In carrying out these and other objects of the invention, there is provided, in one form, a fluid system for controlling fluid losses during hydrocarbon recovery operations, having water, a distribution of graded calcium carbonate particle sizes, a biopolymer which is a non-ionic polysaccharide of the scleroglucan type and a polymerized starch.

DETAILED DESCRIPTION OF THE INVENTION

A fluid system has been discovered using a graded calcium carbonate, a non-ionic polysaccharide of the scleroglucan type, a polymerized starch and water, which has unique properties for controlling fluid losses into permeable formations. The mechanism is apparently due to the fluid's unique filter cake properties. The fluid forms a very durable, thin cake that acts like a check valve on the permeable formation. Surprisingly, the fluid of this invention exhibits little or no removal pressure spike, even when placed at high differential pressure. Testing has indicated the filter cake from the inventive fluid is easy to remove and yields very low or minimal damage to the original permeability of the permeable formation. The rheological properties of this fluid allow it to be used in a number of applications where protection of the original permeable formation is desirable. For example, the applications include drilling, fracturing, and controlling fluid losses during completion operations such as gravel packing or well bore workovers.

The fluid systems of this invention require three main components: (1) a graded calcium carbonate; (2) a non-ionic polysaccharide biopolymer; and (3) a polymerized starch, in addition to water. Because fluids of different characteristics, such as different densities, etc. will have different requirements, it is difficult to specify with precision proportions of the components for all drilling fluids.

In one broad embodiment of the invention, the proportions of the various components range from about 70 to 90 wt. % water; from about 10–30 wt. % graded calcium carbonate particles, about 0.25 to 1 wt. % of the biopolymer and about 1 to 3 wt. % of the polymerized starch. Most preferably, the proportions of the fluid components range from about 82 to 85 wt. % water; about 13 to 14 wt. % blend of graded calcium carbonate particle sizes; about 0.4 to 0.5 wt. % of the biopolymer and about 1.5 to 2.0 wt. % of the polymerized starch. The proportion ranges given above are based upon a fluid with about 4% KCl given a final fluid density of about 9.2 lb/gal. Other proportions would be suitable for brines of different densities, for example, a higher density brine of 14.5 lb/gal calcium chloride-calcium bromide. Other ingredients may also be present in the drilling fluid system as long as they do not adversely affect the performance of the system.

It is important that the calcium carbonate ($CaCO_3$) particles be graded so that their size distribution will be relatively broad or wide and result in a thin filter cake of extremely low permeability, and so that minimal invasion of particles and filtrate will occur when the filter cake forms on the borehole. That is, these drilling muds or drill-in fluids are specially designed systems to be used to drill a production zone with minimal damage to the formation and thus, the subsequent production of hydrocarbons. It will therefore be appreciated that the exact grading for a particular fluid will depend in large measure on the permeability characteristics of the formation. Generally, by the term "graded" it is meant that the calcium carbonate particles have a certain defined size distribution. It has been discovered in the composition of this invention that the graded $CaCO_3$ should have a relatively wide, rather than a narrow distribution of size. That is, the particles should not have too much of any one size in the proportion used in the fluid. For example, Baker Hughes INTEQ W.O. 30C (coarse) product has about 100% of its particles less than 200 microns in diameter but only about 40% of its particles less than 100 microns indicating most of the particles are between 100 and 200 microns which may be too narrow a distribution for most applications of the inventive fluids. A product such as Hubercarb Q-200 has a size distribution that more closely fits the typical formation pore diameters. Its size distribution is 96% less than 76μ, 82% less than 44μ, 50% less than 20μ and 28% less than 10μ. It will be appreciated that even if a particular grade of calcium carbonate is too narrow for this fluid, that by blending two or more grades of calcium carbonate that a particle size distribution may be obtained which is suitable. For example, if Hubercarb Q-200 grade is acceptable, such distribution may be approximated by blends of other products, e.g. 50% of Huber's M-50 and Q-200 products or even a 66% M-50 and 33% Q-200 blend. Examples of commercially available graded calcium carbonate which may be useful in this invention either alone or as blends include, but are not limited to, W.O. 30F, W.O. 30C and Mil-Carb sold by Baker Hughes INTEQ; M- 3, M-4, M-6, M-50, M-70, M-200, M-300, Q-60, Q-100 and Q-200 sold by J. M. Huber Corp. Ideally, the particle size distribution of the fluid system of this invention should be one which is close to or approximates this material. In one aspect of the invention, it has a distribution of the following Table A.

TABLE A

| CaCO_3 Particle Size Distribution | |
| --- | --- |
| Particle Size (microns) | Percent Smaller Than Than Given Size, But Larger Than Next Size |
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6 |

It is believed, without being limited to any one theory, that too narrow a distribution provides too many of the same size of particle which therefore tend to stack like marbles with interstices or spaces between the relatively uniform particles which permit fluid flow therethrough. By using a distribution of various sizes, the gaps between the larger particles are filled by the succeedingly smaller particles. Permeability and porosity are a function of the pore throat size of the particles making up the formation. Using one non-limiting example, if the average pore throat size of the particular formation is x, then the size of the particles used as the bridging particles in the filter cake might be x/6 or some other formula. However, as explained above, not all of the filter media particles should be x/6, but they should be distributed or graded about the x/6 point. For example, x/2 fluid particles would "bridge" across the spaces between the x grains of the formation. In turn, x/3 particles would bridge between the x/2, which in turn would be bridged by the x/4 particles and so forth (to and beyond less than x/6, to x/7, etc.) until complete blockage occurs. While this is an oversimplified illustration, it does explain why a fluid having a wide or graded distribution of calcium carbonate particle sizes forms a more impermeable filter cake than one with a more narrow distribution and uniform particle size. It is also apparent that it is not possible to specify the exact size distribution of the particles in any given fluid, since the distribution depends on the average pore throat size of the formation where the fluid is to be used.

One non-limiting hypothesis about how the invention works involves the polymerized starch and non-ionic polysaccharide polymers coating or encapsulating the calcium carbonate particles with a thin shell in a "loose" way that covers and protects essentially the surface of the well bore, without invading or penetrating into the formation. In some unique way, the filter cake thus built up is durable during operations but may be easily removed at the beginning of the fluid replacement and hydrocarbon recovery phase with little or no pressure spike. The lack of pressure spike is believed to be due to the fact that the filter cake does not invade the formation nor form a cake which is too highly connected and rigid and which peels away particle by particle, rather than in lumps or masses. For example, the filter cakes from the fluid loss system of this invention may be removed at pressures equal to or less than 10 psi.

It has been demonstrated that the effects of "skin damage" (very shallow permeability damage into the formation from the well bore; total thickness: 0.1 ft.) on estimated production can be very minimal. If permeability is reduced by 50% in a small area space as in skin damage (0.5–0.6 ft invasion from the well bore), the overall effect on production is minor, only a 2.1% reduction occurs. On the other hand, if damage to the formation continues reducing the permeability deeper (e.g. from 0.5 to 10 ft into the formation), production can be lowered by 26%.

In one embodiment of the invention, the well bore is in a formation having a permeability, and where the permeability of the formation prior to injecting the fluid system is $K_i$ and the permeability of the formation after removing the filter cake from the well bore is $K_f$. Using the fluid loss system of this invention, $K_f/K_i$ ranges from 0.90 to 1.0, preferably 0.95 to 1.0. In many commercial systems, $K_f/K_i$ is much less than 0.9.

Generally by the term "biopolymer" is meant a water-soluble polymer resulting from the action of bacteria, fungus or other life form on carbohydrates. The purpose of the biopolymer is to build viscosity in the fluid system for suspending and carrying solids. For the purposes of this invention, the suitable biopolymers are non-ionic polysaccharides of the scleroglucan type. Non-ionic polysaccharides of the scleroglucan type are sometimes also called polysaccharide gums or polyglucans. A trade name for a particular scleroglucan found to be suitable for this invention is ACTIGUM® CS 6 DF, manufactured by Sanofi Bio Industries. This product is described as a polysaccharide gum produced by a fungus using an aerobic fermentation process. Thus, the process is similar to that used to produced Xanthum gum or xanthan, but employs a different bacteria. ACTIGUM CS 6 DF is further described as a polyglucan, where the linkages are specified as (1–3)(1–6). The polymer appears to be nonionic in nature since it will disperse and hydrate with elevated temperature in the high density brines such as calcium chloride and calcium bromide brines. It possesses an advantage over hydroxy ethyl cellulose in that the low shear rheology shows gel building properties needed for solids suspensions. It also shows good temperature thinning properties in that the viscosity remains relatively constant over a broad range of temperature. Other scleroglucan polymers with the properties listed above would be suitable.

Another required component of the fluid system of this invention is a polymerized starch. It is evident that the polymerized starch is a different material from the biopolymer described above. The starch should be determined to be compatible with the biopolymer, and also to enhance the viscosity stabilizing properties of the biopolymer. The polymerized starch also is added as a secondary bridging agent or filtration control agent. In one non-limiting example, a suitable polymerized starch is obtained from Chemstar called Exstar 2205. This product was chosen from several products based upon its good leak-off control and return permeability results. Although its molecular weight is unknown, its molecular weight has been increased by polymerization and thus serves as a more effective bridging agent in the inventive system as compared with more conventional starches.

The fluid loss system of this invention provides a filter cake which does not have to be removed from the wall of the formation or from prepacked perforations before gravel packing. The filter cake will pass through the gravel pack and screen. All commercially available products require removal of the filter cake prior to placement of the gravel pack because its removal damages the formation and the cake material will not pass through the gravel pack and screen. The filter cake formed by the inventive fluid loss system and the fluid when used as a prepad for "frac packing" will pass through the frac pack. All products of this nature on the market are damaging and will not return through the pack. For example, the particles of the filter cake will easily pass through the sand used to prop apart the fractures in the formation. The ability of the filter cake to pass through these structures is further evidence that it may break up one particle at a time, rather than in masses or clumps.

The invention will now be further described by the use of the following non-limiting Examples which are merely illustrative without being restrictive.

EXAMPLES 1 AND 2

A fluid/mud system of this invention (Example 1) and one of more conventional formulation (Example 2) were assembled as described in Table I.

TABLE I

| Compositions of Fluid Loss Systems | | |
|---|---|---|
| Component | (Inventive) Example I | (Comparative) Example 2 |
| Water, cc | 317 | 317 |
| Actigum CS 6 DF, g | 1.5 | — |
| Biozan, g | — | 1.36 |
| B-641, g | 50 | — |
| W.O. 30 C., g | — | 25 |
| W.O. 30 F., g | — | 25 |
| Dicalite 104, g | — | 25 |
| Exstar, g | 6 | — |
| Filtrex, g | — | 15 |
| KCl 4%, g | 12.9 | 12.9 |

For both Examples, the HPHT dynamic filtration unit testing parameters were maintained at 300 rpm, 500 psi and 250° F. Dynamic filtration results are as shown in Table II.

TABLE II

| Dynamic Filtration Results: Examples 1 and 2 | | | | | | | | | | | | | |
|---|---|---|---|---|---|---|---|---|---|---|---|---|---|
| | Minutes | | | | | | | | | | | | |
| | 1 | 2 | 3 | 4 | 5 | 6 | 7 | 8 | 9 | 10 | 15 | 20 | 25 | 30 |
| | Example 1 | | | | | | | | | | | | |
| Cumulative Filtrate | 5.5 | 6.5 | 7.0 | 7.5 | 8.0 | | | | | 9.0 | 10.5 | 11.5 | 12.5 | 13.0 |
| ×2 | 11.0 | 13.0 | 14.0 | 15.0 | 16.0 | | | | | 18.0 | 21.0 | 23.0 | 25.0 | 26.0 |

TABLE II-continued

Dynamic Filtration Results: Examples 1 and 2

| | Minutes | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 15 | 20 | 25 | 30 |
| Cake Thickness (mm) | 1.0 | | | | | | | | | | | | | |
| | | | | | | Example 2 | | | | | | | | |
| Cumulative Filtrate | 2.1 | 3.5 | 4.7 | 5.7 | 6.6 | 6.9 | 7.5 | 8.1 | 8.6 | 9.1 | 11.1 | 12.7 | 14.2 | 15.3 |
| ×2 | 4.2 | 7.0 | 9.4 | 11.4 | 13.2 | 13.8 | 15.0 | 16.2 | 17.2 | 18.2 | 22.2 | 25.4 | 28.4 | 30.6 |
| Cake Thickness (mm) | 2 | | | | | | | | | | | | | |

Return permeability analysis was done with high permeability Berea Sandstone. LVT-200 was used for simulation of oil. Return permeability was determined to be 90% for the Example 1 fluid and 60% for the Example 2 fluid. It is apparent that the inventive fluid of Example 1 had better fluid loss control (26.0 v. 30.6 at 30 minutes) and better return permeability (90% v. 60%).

EXAMPLE 3

Drill-in fluids tested in this Example were two different calcium carbonate fluids with different particle size distributions and a graded salt drilling fluid. The drill-in fluid DFA of this invention was a graded calcium carbonate fluid recommended for use on reservoirs from 60 millidarcies (md) to 5000 md of permeability. This fluid consisted of water soluble polymers, and the graded calcium carbonate.

DFA—Drill-in Fluid A is a standard 4% KCl fluid (14 lb/bbl KCl) including additionally 50 lb/bbl B-641 calcium carbonate, 1.5 lb/bbl ACTIGUM® CS 6 DF and 6.0 lb/bbl Exstar 2205.

DFB—Drill-in Fluid B uses the same polymer composition as DFA, but with a different particle sized calcium carbonate. DFB demonstrates the effect of choosing too narrow particle size distribution. Specifically, the particle size distribution was custom sized for 3000 md of reservoir permeability and was not as widely distributed over as many sizes as that of DFA DFC—Drill-in Fluid C is a fluid prepared with a sized salt (NaCl) for bridging purposes. It also contained a xanthum derivative polymer and an organic starch to enhance fluid loss properties of the fluid.

DFD—Drill-in Fluid D is essentially the same as DFA with the exception that a coarser particle size distribution of the calcium carbonate (specifically B- 647) was used to effectively bridge the relatively coarse gravel packs. This demonstrates that the graded calcium carbonate must be sized to the gravel pack used.

Flow Test Description

A flow test apparatus was constructed so that a $CaCO_3$ or NaCl particle filter cake could be placed inside a 3 in. (76 mm) I.D. porous aluminum oxide tube. This porous tube was attached to 3 in. (76 mm) I.D. PVC tubes (above and below the porous tube) and placed inside a 6 in. (150 mm) transparent, methylacrylate tube with flanges on each end. The total length of the inner concentric tubing string was 7 ft. (2.0 m). A centrifugal pump was manifolded to the test vessel, such that fluid could be circulated through the inner string or displaced through the concentric tubing annulus (formed by the inner string and the methylacrylate tube), through the porous tube (from outside to inside) and out through the inner tube. Pressure transducers were placed at the inlets and outlets of the inner tube and the concentric annulus. The pressure differential across the inlet and outlet of the inner tube was also monitored. A flow meter was also used on the discharge of the centrifugal pump so that all flow rates could be accurately monitored. All data was collected by a dedicated computer for each test performed and fluid losses from the inner tube were manually measured.

Test Procedures

Before performance of the actual flow tests, the "system pressure drop" was determined so that friction pressures would not be included in permeability calculations. The system pressure drop was determined by replacing the porous aluminum oxide tube with a perforated tube having the same dimensions of the porous tube. Fluid was injected through the concentric annulus, through the perforated tube and out of the apparatus through the 3 in. (76 mm) tube located below the perforated tube. The recorded pressure drops were, essentially, due to friction pressure and this friction pressure was termed the "system pressure drop".

The test procedure used for each completion fluid with three different drilling fluid systems is outlined below.

1. The test apparatus was filled with filtered tap water and the initial permeability of the porous tube was established by circulating filtered fluid through the annulus and porous tub. The pressure drop across the porous tub (from outside to inside) was calculated by subtracting the "system pressure drop" from the observed pressure drop. This method eliminated friction pressure from the calculation. Darcy's radial flow equation was used, with the corrected pressure drop to calculate the porous tube's permeability.

2. The filter cake was placed on the inside of the porous tube by circulating the appropriate drilling fluid through the inner tubing string at 1.5 BPM (barrels per min.; 0.2 $m^3$/min.) while allowing leak off through the porous tub to the annulus. After 10 minutes, the circulation rate was increased to 4.5 BPM (0.7 $m^3$/min.) and circulated at this rate for 10 minutes. Pressure drop between tubing and annulus was 50–60 psig (350 to 420 kPa).

3. The circulation rate was decreased to 1 BPM (0.16 $m^3$/min.) and the completion fluid was circulated for 10 minutes at this rate. Visual observations could be made through the transparent methylacrylate outer tube to see if the completion fluid was leaking off through the filter cake. In addition to visual observations, the valve on the annulus was left open so that the leak off rate could be measured.

4. After 10 minutes of circulation, the circulating rate was incremented to 2 BPM (0.3 m³/min.) and maintained for 10 minutes.
5. The circulation rate was then incremented to 3.0 BPM (0.5 m³/min.) and held at this rate for 20 minutes. Fluid loss rates were monitored throughout the test.
6. While circulating at 3 BPM (0.5 m³/min.), 1 lb/U.S. gal (120 kg/m³) of 40–60 sand, was added to the completion fluid and continued at this rate for another 20 minutes. During all circulation tests the pressure difference between the inside and outside of the porous tube was maintained at 50 to 60 psig (350 to 420 kPa) by application of back pressure.
7. After the circulation tests were completed (steps 1. through 6.) the final permeability of the porous tube was measured by circulating filtered tap water through the porous tube (from outside to inside) via the annular circulation path.
8. Darcy's radial flow equation was then applied to calculate the final permeability of the porous tube.
9. A ratio of final permeability to initial permeability was then calculated for each fluid tested.

Besides the three drill-in fluids DFA, DFB and DFC tested, three completion fluids, with and without 40–60 U.S. mesh sand were also tested. These fluids were: (1) filtered tap water (filtered, saturated NaCl brine for use with the graded salt drilling fluid), (2) filtered tap water viscosified with 0.48% hydroxyethylcellulose (HEC) (filtered saturated NaCl brine viscosified with 0.48% HEC for the graded salt drilling fluid), and (3) filtered tap water viscosified with 0.43% xanthum gum derivative (filtered, saturated NaCl brine viscosified with 0.43% xanthum gum derivative polymer for the graded salt drilling fluid). When sand was added to the fluids, a concentration of 1 lbm/U.S. gal (120 kg/m³) of 40–60 mesh gravel pack sand per U.S. gallon of completion fluid was used. The sand slurries were tested because horizontal wells are sometimes gravel packed with these fluids. The data attained from the flow tests is summarized in Tables III through V. Each Table reflects the test results of all six completion fluid tests with a specific drilling fluid.

The porous tube permeabilities ranged from 3500 md to 6500 md, and the typical test pressures all ranged from 50–60 psig (350–420 kPa).

When the DFA and DFB drill-in fluids were tested, the filter cakes manifested very little change with respect to fluid loss. The fluid loss rate appeared to be independent of completion fluid circulation rate with the exception of the water and sand slurry. When the sand was added to the water and this slurry was initially circulated across the filter cake, an initial increase in fluid loss was observed. However, as circulation time increased, the fluid loss rate again decreased to a level that was slightly greater than that of the water without sand. It should be noted that the fluid losses were much greater with DFC.

Initial fluid losses for the HEC viscosified fluid were extremely high when compared to other fluids tested and this cannot be readily explained and did not correlate with dynamic filtration tests.

In summary, the filter cake particles for all drill-in fluids tested did not appear to be eroded by circulation of the completion fluids. However, when sand was added to the filtered water (or saturated brine) the initial fluid loss rate increased as the brine-sand slurry reached the filter cake. But as circulation was continued the fluid loss rates began to decrease. This phenomenon could be due to a partial erosion of some filter cake particles, initially, coupled with the deposition of sand particles on top of the remaining filter cake. Most of the filter cake particles, $CaCO_3$ and $NaCl$, were removed by back flow, i.e. flow from outside to inside of the porous tube.

TABLE III

Well Simulator Flow Test Results - Drill-in Fluid A (DFA)
Porous Tube I.D. = 3"; L = 2 ft.

| | | | |
|---|---|---|---|
| Initial Permeability, $K_i$, md | 3534 | 4725 | 6304 |
| Placement of Filter Cake | | | |
| Fluid Pad Circulation loss | | | |
| Filtrate Rate at 1.5 BPM, cc/min. | | | |
| 1 min | 28 | 28 | 44 |
| 3 min | 18 | 22 | 34 |
| 6 min | 16 | 18 | 30 |
| 9 min | 14 | 17 | 30 |
| Filtrate Rate at 4.5 BPM, cc/min. | | | |
| 1 min | 12 | 14 | 32 |
| 3 min | 12 | 14 | 18 |
| 6 min | 12 | 14 | 16 |
| 9 min | 12 | 14 | 16 |
| Completion Fluid Type | Water | 0.43% XC | 0.48% HEC |
| Completion Fluid Circulation Loss | | | |
| Fluid Loss at 1 BPM, cc/min. | | | |
| 1 min | 48 | 12 | |
| 3 min | 48 | 12 | 240 |
| 6 min | 38 | 12 | 116 |
| 9 min | 28 | 12 | 74 |
| Fluid Loss at 2 BPM, cc/min. | | | |
| 1 min | 24 | 12 | |
| 3 min | 24 | 12 | 36 |
| 6 min | 26 | 12 | 26 |
| 9 min | 26 | 12 | 22 |
| Fluid Loss at 3 BPM, cc/min. | | | |
| 1 min | 30 | 12 | 20 |
| 3 min | 31 | 12 | 18 |
| 6 min | 32 | 12 | 18 |
| 9 min | 32 | 10 | 12 |
| Gravel Slurry Circulation Loss | | | |
| Fluid Loss at 3 BPM, cc/min. | | | |
| 1 min | 220 | 10 | 12 |
| 5 min | 64 | 10 | 12 |
| 10 min | 52 | 12 | 12 |
| 20 min | 48 | 12 | 12 |
| Final Permeability, $K_f$, md | 3121 | 4243 | 4702 |
| Return Permeability Ratio, $K_f/K_i$ | 0.88 | 0.90 | 0.75 |

TABLE IV

Well Simulator Flow Test Results - Drill-in Fluid B (DFB)
Porous Tube I.D. = 3"; L = 2 ft.

| | | | |
|---|---|---|---|
| Initial Permeability, $K_i$, md | 3279 | 3260 | 3260 |
| Placement of Filter Cake | | | |
| Fluid Pad Circulation loss | | | |
| Filtrate Rate at 1.5 BPM, cc/min. | | | |
| 1 min | | | 36 |
| 3 min | 36 | 36 | 26 |
| 6 min | 32 | 30 | 24 |
| 9 min | 30 | 20 | 20 |

TABLE IV-continued

Well Simulator Flow Test Results - Drill-in Fluid B (DFB)
Porous Tube I.D. = 3"; L = 2 ft.

Filtrate Rate at 4.5 BPM, cc/min.

| | | | |
|---|---|---|---|
| 1 min | 32 | 20 | 20 |
| 3 min | 32 | 20 | 20 |
| 6 min | 38 | 20 | 20 |
| 9 min | 38 | 20 | 20 |
| Completion Fluid Type | Water | 0.43% XC | 0.48% HEC |

Completion Fluid Circulation Loss

Fluid Loss at 1 BPM, cc/min.

| | | | |
|---|---|---|---|
| 1 min | 18 | 15 | 350 |
| 3 min | 10 | 18 | 350 |
| 6 min | 10 | 16 | 250 |
| 9 min | 18 | 16 | 170 |

Fluid Loss at 2 BPM, cc/min.

| | | | |
|---|---|---|---|
| 1 min | 20 | 15 | 150 |
| 3 min | 26 | 14 | 122 |
| 6 min | 28 | 16 | 100 |
| 9 min | 28 | 15 | 90 |

Fluid Loss at 3 BPM, cc/min.

| | | | |
|---|---|---|---|
| 1 min | 26 | 15 | 70 |
| 3 min | 28 | 15 | 58 |
| 6 min | 30 | 15 | 50 |
| 9 min | 32 | 14 | 36 |

Gravel Slurry Circulation Loss
Fluid Loss at 3 BPM, cc/min.

| | | | |
|---|---|---|---|
| 1 min | 98 | 26 | 32 |
| 5 min | 60 | 22 | 30 |
| 10 min | 48 | 22 | 28 |
| 20 min | 42 | 20 | 20 |
| Final Permeability, $K_f$, md | 3156 | 2921 | 2868 |
| Return Permeability Ratio, $K_f/K_i$ | 0.96 | 0.90 | 0.88 |

TABLE V

Well Simulator Flow Test Results - Drill-in Fluid C (DFC)
Porous Tube I.D. = 3"; L = 2 ft.

| | | | |
|---|---|---|---|
| Initial Permeability, $K_i$, md | 3141 | 2743 | 3164 |

Placement of Filter Cake
Fluid Pad Circulation loss

Filtrate Rate at 1.5 BPM, cc/min.

| | | | |
|---|---|---|---|
| 1 min | 22 | 40 | 46 |
| 3 min | 20 | 26 | 38 |
| 6 min | 14 | 16 | 38 |
| 9 min | 14 | 14 | 38 |

Filtrate Rate at 4.5 BPM, cc/min.

| | | | |
|---|---|---|---|
| 1 min | 10 | 14 | 38 |
| 3 min | 10 | 12 | 38 |
| 6 min | 10 | 12 | 38 |
| 9 min | 10 | 12 | 38 |
| Completion Fluid Type | NaCl | 0.43% XC | 0.48% HEC |

Completion Fluid Circulation Loss

Fluid Loss at 1 BPM, cc/min.

| | | | |
|---|---|---|---|
| 1 min | 1000 | | 1500 |
| 3 min | 950 | 200 | 1700 |
| 6 min | 280 | 112 | 3500 |
| 9 min | 82 | 34 | 3500 |

Fluid Loss at 2 BPM, cc/min.

| | | | |
|---|---|---|---|
| 1 min | 96 | | 3200 |
| 3 min | 90 | 28 | 2700 |
| 6 min | 74 | 26 | 2400 |

TABLE V-continued

Well Simulator Flow Test Results - Drill-in Fluid C (DFC)
Porous Tube I.D. = 3"; L = 2 ft.

| | | | |
|---|---|---|---|
| 9 min | 62 | 24 | 2200 |

Fluid Loss at 3 BPM, cc/min.

| | | | |
|---|---|---|---|
| 1 min | 74 | 34 | 1800 |
| 3 min | 64 | 34 | 1600 |
| 6 min | 58 | 34 | 1400 |
| 9 min | 46 | 18 | 1100 |

Gravel Slurry Circulation Loss
Fluid Loss at 3 BPM, cc/min.

| | | | |
|---|---|---|---|
| 1 min | 188 | 30 | 1200 |
| 5 min | 56 | 30 | 1100 |
| 10 min | 32 | 18 | 1000 |
| 20 min | 24 | 16 | 800 |
| Final Permeability, $K_f$, md | 3071 | 2335 | 2641 |
| Return Permeability Ratio, $K_f/K_i$ | 0.98 | 0.85 | 0.83 |

Dynamic Filtration and Filter Cake Stability Test Procedure

Dynamic filtration tests were performed using DFD according to the following procedure. The test utilized a Dynamic HT-HP Filtration unit as described by Chesser, B. G., et al., "Dynamic and Static Filtrate Loss Techniques for Monitoring Filter Cake Quality Improves Drilling Performance," SPE 20439, 1990 SPE Annual Technical Conference and Exhibition, New Orleans, LA, Sept. 23–26, 1990. The design and operating characteristics of this device were published in Chesser, B. G., "Dynamic Filtration of Drilling Fluid," *Advances in Filtration and Separation Technology, American Filtration Society*, Vol. 1, 1990, pp. 103–107. These articles are incorporated by reference herein and thus will not be given here. The device consisted essentially of a high pressure filtration cell fitted with a motor driven shaft and propeller providing dynamic erosion of the cake. A three-bladed "tear-shaped" propeller with 1/16 in. clearance at the cell wall was utilized, providing a circulating action downward on the cake. This design tends to eliminate the highly variable shear rate from center to outer cell wall that is prevalent in a simple circular stirring motion.

The drilling fluid and flushing fluid were prepared immediately before the test. The dynamic filtration test to form the filter cake with the drilling fluid is as follows: the fluid was filtered dynamically at 150° F., 500 psi (3500 kPa) and 300 rpm for 30 minutes. After forming the cake, the drilling fluid is removed from the cell and replaced with the flush fluid to measure the effects of the flush fluid on the existing filter cake. The flush fluid ran at 300 rpm with 500 psi (3500 kPa) for 30 min. measuring the filtration every five minutes.

The leakoff characteristics of both DFD and the typical completion fluids observed in the flow test apparatus were similar to the dynamic filtration tests, performed at 250° F. (120° C.) and 500 psi (3500 kPa). Table VI displays the results of the dynamic filtration and filter cake stability tests. The results show only a small increase in filtration rate after flushing 40 min. with HEC fluid at 300 rpm.

TABLE VI

Dynamic Filtration and Cake Stability Test Results
Test Conditions: 150° F., 500 psi, 300 rpm
Drilling Fluid D (DFD)

| Time, minutes | Filtration Volume, ml |
|---|---|
| *Dynamic Filtration of Fluid Pad* | |
| 1 | 4.5 |
| 2 | 5.5 |
| 3 | 5.9 |
| 4 | 6.2 |
| 5 | 6.8 |
| 10 | 8.3 |
| 15 | 9.5 |
| 20 | 10.5 |
| 25 | 11.3 |
| 30 | 11.9 |
| *Filter Cake Stability Test* | |
| *Flush Fluid - HEC @ 300 rpm* | |
| 1 | 0.5 |
| 2 | 0.6 |
| 3 | 0.6 |
| 4 | 0.7 |
| 5 | 0.8 |
| 10 | 1.1 |
| 15 | 1.5 |
| 20 | 2.0 |
| 25 | 2.5 |
| 30 | 3.0 |

TABLE VII

Well Simulator Flow Test Results
Using Perfflow ® prepared with W-307

| | Test 1 | Test 2 | Test 3 |
|---|---|---|---|
| Initial Permeability $K_i$, md | 3618 | 3618 | 3618 |
| *Drill-In Fluid Circulation Loss* | | | |
| Filtrate Rate at 1.5 BPM, cc/min | | | |
| 1 min | 850 | 2000 | 850 |
| 3 min | 18 | 22 | 18 |
| 6 min | 15 | 15 | 15 |
| 9 min | 12 | 12 | 12 |
| Filtrate Rate at 4.5 BPM, cc/min | | | |
| 1 min | 10 | 14 | 11 |
| 3 min | 10 | 14 | 10 |
| 6 min | 10 | 10 | 10 |
| 9 min | 10 | 12 | 10 |

TABLE VIII

Well Simulator Flow Test Results
Using Perfflow ® prepared with W-307

| | Test 1 | Test 2 | Test 3 |
|---|---|---|---|
| Completion Fluid Type | Water | 36 pptg XC | 50 pptg HEC |
| *Completion Fluid Circulation Loss* | | | |
| Fluid Loss at 1 BPM, cc/min | | | |
| 1 min | 16 | 12 | 16 |
| 3 min | 15 | 8 | 11 |
| 6 min | 13 | 8 | 47 |
| 9 min | 20 | 8 | 103 |
| Fluid Loss at 2 BPM, cc/min | | | |
| 1 min | 16 | 8 | 120 |

TABLE VIII-continued

Well Simulator Flow Test Results
Using Perfflow ® prepared with W-307

| | Test 1 | Test 2 | Test 3 |
|---|---|---|---|
| 3 min | 22 | 7 | 85 |
| 6 min | 24 | 7 | 70 |
| 9 min | 26 | 7 | 90 |
| Fluid Loss at 3 BPM, cc/min | | | |
| 1 min | 25 | 7 | 120 |
| 3 min | 26 | 7 | 60 |
| 6 min | 29 | 7 | 73 |
| 9 min | 28 | 7 | 57 |

Return Permeability Tests

Additional testing was performed to see if it was possible for the filter cake particles to flow through a gravel pack of 20–40 U.S. mesh sand and what effect this would have on return permeability. The test procedure was as follows:

1. A sand bed of 20–40 U.S. mesh gravel pack sand was placed on top of the 140–270 sand pack and was contained between the sand pack and a screen at the top of the cell.

2. Oil was injected through the 140–270 U.S. mesh sand pack and 20– 40 U.S. mesh gravel pack to determine the effective initial permeability of both sand beds.

3. The 20–40 U.S. mesh sand pack was removed and a filter cake was produced on the 140–270 U.S. mesh sand pack by subjecting the specific drilling fluid to the face of the sand bed while holding a differential pressure of 200 psig. This allowed the drilling fluid to leak off through the sand pack and deposit its filter cake. The spurt (initial) and filtrate losses were measured and recorded.

4. The 20–40 U.S. mesh sand was then repacked on the 140–270 U.S. mesh pack.

5o Oil was then injected from the 140–270 U.S. mesh sand pack side, through the simulated gravel pack. The flow rate and pressure drop across the two sand packs were recorded as a function of total volume of fluid displaced. The return permeability of the two sand packs could then be used to indicate the degree of filter cake particle displacement. Table XII reflects the results of the particle displacement tests.

The test using DFD showed a return permeability of 76.3%. This indicated that most of the filter cake particles were capable of flowing through a 20–40 U.S. mesh gravel pack.

The "particle flow" tests performed with a filter cake from the graded salt system, DFC, indicate a return permeability of 42% after displacement of 3 liters of tap water, at which time the injection pressure stabilized.

Testing

As mentioned, in order for a solid ladened fluid to mechanically seal pore openings it first must be comprised of the proper size particles. The particle size analysis of B-641 calcium carbonate used in this drill-in fluid indicates a wide distribution of particles of very different sizes as shown in Table IX. As shown from Table IX, the particle size is evenly distributed from colloidal to 60 microns. Table X illustrates the particle size analysis of the drill-in fluid as tested.

TABLE IX

Particle Size Analysis - B-641
Cilas 715 Granulometer Particle Size Analyzer

| Particle Size (microns) | Percent Smaller Than Given Size | Percent Smaller Than Given Size, But Larger than Next Size |
|---|---|---|
| 128 | 100 | 0 |
| 96 | 100 | 6.8 |
| 64 | 93.2 | 6.8 |
| 48 | 86.4 | 20.3 |
| 32 | 66.1 | 12.4 |
| 24 | 53.7 | 10.4 |
| 16 | 43.3 | 7.3 |
| 12 | 36 | 7.2 |
| 8 | 28.8 | 6.2 |
| 6 | 22.6 | 5.8 |
| 4 | 16.8 | 3.9 |
| 3 | 12.9 | 2.9 |
| 2 | 10 | 2.8 |
| 1.5 | 7.2 | 1.2 |
| 1 | 6 | 6 |

| | |
|---|---|
| Calculated Surface Area ($m^2/cm^3$) | 1.48 |
| 90% Smaller than (microns) | 54.8 |
| 50% Smaller than (microns) | 21.2 |
| 10% Smaller than (microns) | 2 |

TABLE X

Particle Size Analysis - Formulated Fluid Pad
Cilas 715 Granulometer Particle Size Analyzer

| Particle Size (microns) | Percent Smaller Than Given Size | Percent Smaller Than Given Size, But Larger than Next Size |
|---|---|---|
| 192 | 100 | 0 |
| 128 | 100 | 2.3 |
| 96 | 98.7 | 10.8 |
| 64 | 86.9 | 10.2 |
| 48 | 79.0 | 16.7 |
| 32 | 60.0 | 12.9 |
| 24 | 49.0 | 9.3 |
| 16 | 37.8 | 7.3 |
| 12 | 31.6 | 5.4 |
| 8 | 25.1 | 5.1 |
| 6 | 20.8 | 3.9 |
| 4 | 16.1 | 3.6 |
| 3 | 13.0 | 2.7 |
| 2 | 9.8 | 3.5 |
| 1.5 | 6.7 | 1.0 |
| 1 | 5.3 | 5.3 |

| | |
|---|---|
| Calculated Surface Area ($m^2/cm^3$) | 1.34 |
| 90% Smaller than (microns) | 70.5 |
| 50% Smaller than (microns) | 24.7 |
| 10% Smaller than (microns) | 2.0 |

Dynamic Filtration Test

The dynamic filtration tests were conducted at 250° F. with 500 psi differential pressure and stirring the fluid at 300 rpm for 30 minutes. The filter cakes formed from the dynamic filtration (see Table XI) were measured and found to be very thin (1–1.5 mm) and extremely durable. As one would expect, the cumulative filtration using the low permeability berea was less than the filtration using the aloxite disk, but the equilibrium filtration rates after the filter cakes were formed were identical. This illustrates that the resulting filter cakes have very low permeability and quickly control the filtration of the fluid.

TABLE XI

Dynamic Filtration Test

Temperature = 250° F.
Diff. Pressure = 500 psi
RPM = 300

| | Test 1 | Test 2 |
|---|---|---|
| Filter Medium | Aloxite (2–4 Darcy) | Berea (150 md) |
| Cake Thickness, mm | 1 | 1.5 |
| Time (minutes) | Cumulative Filtration (mL) | |
| 0 | 0 | 0 |
| 1 | 4.5 | 1.5 |
| 2 | 5.5 | 2 |
| 3 | 6 | 2.2 |
| 4 | 6.5 | 2.5 |
| 5 | 7 | 2.8 |
| 6 | 7.5 | 3.2 |
| 7 | 8 | 3.5 |
| 8 | 8.2 | 3.7 |
| 9 | 8.5 | 4 |
| 10 | 8.7 | 4.2 |
| 15 | 9.5 | 5 |
| 20 | 10.5 | 5.8 |
| 25 | 11.5 | 6.5 |
| 30 | 12 | 7.2 |

TABLE XII

Leak-Off and Return Permeability Test

Conditions:

4% KCl Perfflow
5.25 in. × 2.0 in. Dia. Core with 0.75 in. dia. hole 2.25 in. depth
800 md permeability
1.5 in annular pack 20/40 gravel
Run at 70° C. and 200 psi Filtration During Bridging and Leak Off Test

| Time. min. | Fluid Loss, cc/cm² | Interval Loss, cc/cm² |
|---|---|---|
| 1 | 4.2 | |
| 4 | 4.8 | 0.6 |
| 9 | 5.4 | 0.6 |
| 16 | 5.9 | 0.5 |
| 25 | 6.1 | 0.2 |
| 36 | 6.4 | 0.3 |
| 49 | 6.9 | 0.5 |
| 60 | 7 | 0.1 |

Initial and Return Oil Permeabilities

| | Initial Oil Permeability | | Return Oil Permeability | |
|---|---|---|---|---|
| Vol. Pumped, cc | Diff. Pres., psi | Flow Rate, cc | Diff Pres., psi | Flow Rate, cc |
| Break-Out, psi | | | 28.8 | 0 |
| 00 | 10.4 | 190 | 15.9 | 200 |
| 0 | 10.4 | 190 | 15.5 | 206 |
| 0 | 10.4 | 190 | 12.5 | 175 |
| 0 | 9.7 | 177 | 12.7 | 179 |
| 0 | 9.7 | 178 | 12.7 | 176 |
| 0 | 9.7 | 184 | 12.7 | 178 |

Percent Return Permeability = 76.3%

EXAMPLE 4

Objective: To determine the return permeability of 4% KCl PERFFLOW® after bridging on 20/40 gravel and flowing back through 20/40 gravel using PERFFLOW Fluid DFD.

Test Procedure: This test utilized a 5.25 in.×2.0 in. diameter 800 md berea core. A 0.75 in. diameter hole 2.25 in. in depth was drilled concentrically into the core to simulate a perforation. A 1.5 in. sleeve was placed above the core to represent an annular space. After assembling the core and sleeve in a core holder, the annular space and perforation was packed with 20/40 gravel and an initial oil permeability of the core and sand pack was established. The annular gravel was then removed and the volume filled with the PERFFLOW fluid DFD. DFD has a coarser particle size than fluid DFA. The core was heated to 70° C. and 250 psi pressure applied during a 1-hour leak-off test. The cell was then opened, the remaining PERFFLOW poured off, taking care not to disturb the filter cake. The annular gravel was replaced on top of the cake and the cell reassembled. The return permeability of the exposed core was then determined by flowing oil in the original production direction. The results are shown in Table XIII.

TABLE XIII

Filtration During Bridging and Leak-Off Control Test

| Time. min. | Fluid Loss, cc/cm² | Interval Loss, cc/cm² |
| --- | --- | --- |
| 1 | 4.6 | 1.1 |
| 4 | 5.7 | 0.8 |
| 9 | 6.5 | 1.1 |
| 16 | 7.6 | 1.0 |
| 25 | 8.6 | 0.6 |
| 36 | 9.2 | 0.7 |
| 49 | 9.9 | 0.3 |
| 60 | 10.2 | |

Initial and Return Oil Permeabilities

| | Initial Oil Permeability | | Return Oil Permeability | |
| --- | --- | --- | --- | --- |
| Vol. Pumped, cc | Diff. Pres., psi | Flow Rate, cc | Diff Pres., psi | Flow Rate, cc |
| Break-Out, psi | 0 | — | 19.0 | — |
| 500 | 10.6 | 122 | 13.5 | 162 |
| 1000 | 10.2 | 126 | 10.4 | 130 |
| 1500 | 10.1 | 128 | 10.4 | 126 |
| 2000 | 10.1 | 128 | 10.4 | 130 |
| 2500 | 10.1 | 132 | 10.3 | 130 |
| 3000 | 10.1 | 130 | 10.3 | 130 |

Percent Return Permeability = 98.1%

Many modifications may be made in the composition and implementation of this invention without departing from the spirit and scope thereof which are defined only in the appended claims. For example, the exact non-ionic scleroglucan and exact polymerized starch may be different from those used here and the graded calcium carbonate may have a different exact size distribution than those used in these examples.

GLOSSARY

20–40 Frac Sand 40–60 Frac Sand
  Gravel pack sand per API specifications: RP 58 Mar. 31, 1986.
Actigum CS 6 DF
  A polysaccharide gum or a polyglucan prepared by a fungus using a fermentation process, available from Sanoff Bio Industries. It can be specifically described as a scleroglucan.
B-641 B-647
  Graded or sized calcium carbonates to bridge pore openings, available from Baker Hughes INTEQ. B-641 corresponds to Hubercarb Q-200, and B-647 corresponds to Hubercarb M-70, both available from J. M. Huber Corp.
Biozan®
  A water soluble polymer used as thixotropic polymer sold by Baker Hughes INTEQ, manufactured by Kelco.
Exstar 2205
  A polymerized starch with the degree of polymerization adjusted to minimize leak-off but with sufficient water solubility to enhance filter cake dispensability, available from Chemstar.
LVT-200
  Synthetic oil marketed through Conoco Inc.
Perfflow®
  A drilling completion fluid especially formulated to control fluid loss in low to high permeable sands and provide a filter cake that can easily and effectively be removed by the produced fluid without acidizing or breaker treatment.
W-307
  A dispersion of water soluble polymers in tripropylene glycol used to prepare a Perfflow fluid. This dispersion prevents the formation of nondispersed polymer globules (fish eyes) when preparing the fluid in the field.

We claim:
1. A method of protecting a well bore during a hydrocarbon recovery operation and controlling fluid losses during such operation, comprising:
  injecting a fluid system for controlling fluid losses during hydrocarbon recovery operations into the well bore, said well bore having a surface, said fluid system comprising:
    water;
    a distribution of graded calcium carbonate particle sizes; and
    at least one non-ionic polysaccharide of the scleroglucan type; and
    at least one starch that has had its molecular weight increased by polymerization, which starch is different from the non-ionic polysaccharide;
  permitting the fluid system to form a filter cake on the surface of the well bore;
  conducting the hydrocarbon recovery operation within the filter cake within the well bore; and
  removing the filter cake from the well bore.
2. The method of claim 1 where the fluid system comprises from about 70 to 90 wt. % water; from about 10 to 30 wt. % blend of graded calcium carbonate particle sizes; from about 0.25 to 1 wt. % of non-ionic polysaccharide of the scleroglucan type and from about 1 to about 3 wt. % polymerized starch.
3. The method of claim 1 where the fluid system comprises from about 73 to 83 wt. % water; about 13 to 24 wt. % blend of graded calcium carbonate particle sizes; from about 0.4 to 0.5 wt. % of non-ionic polysaccharide of the scleroglucan type and from about 1.5 to about 2.0 wt. % polymerized starch.
4. The method of claim 1 where in the step of removing the filter cake from the well bore, the filter cake is removed by produced reservoir fluids.
5. The method of the claim 1 where the well bore is in a formation having a permeability, and where the permeability of the formation prior to injecting the fluid system is $K_i$ and the permeability of the formation after removing the filter cake from the well bore is $K_p$, and where $K_p/K_i$ ranges from 0.5 to 1.0.

6. A fluid system for controlling fluid losses during hydrocarbon recovery operations, comprising:

water;

a distribution of graded calcium carbonate particle sizes;

a non-ionic polysaccharide of the scleroglucan type; and a starch that has had its molecular weight increased by polymerization, which starch is different from the non-ionic polysaccharide.

7. The fluid system of claim 6 where the system comprises from about 70 to 90 wt. % water; from about 10 to 30 wt. % blend of graded calcium carbonate particle sizes; from about 0.25 to 1 wt. % of non-ionic polysaccharide of the scleroglucan type and from about 1 to about 3 wt. % polymerized starch.

8. The fluid system of claim 6 where the system comprises from about 82 to 85 wt. % water; from about 13 to 14 wt. % blend of graded calcium carbonate particle sizes; from about 0.4 to 0.5 wt. % of non-ionic polysaccharide of the scleroglucan type and from about 1.5 to about 2.0 wt. % polymerized starch.

9. The fluid system of claim 6 further having the property of forming a durable filter cake which can be removed by produced reservoir fluids.

10. The fluid system of claim 6 where the graded calcium carbonate particle sizes comprise the following distribution:

| Particle Size (microns) | Percent Smaller Than Than Given Size, But Larger Than Next Size |
|---|---|
| 128 | 0 |
| 96 | 6.1–7.5 |
| 64 | 6.1–7.5 |
| 48 | 18.3–22.3 |
| 32 | 11.2–13.6 |
| 24 | 9.4–11.4 |
| 16 | 6.6–8.0 |
| 12 | 6.5–7.9 |
| 8 | 5.6–6.8 |
| 6 | 5.2–6.4 |
| 4 | 3.5–4.3 |
| 3 | 2.6–3.2 |
| 2 | 2.5–3.1 |
| 1.5 | 1.1–1.3 |
| 1 | 5.4–6.6. |

* * * * *